United States Patent
Cho et al.

(10) Patent No.: US 12,351,156 B2
(45) Date of Patent: Jul. 8, 2025

(54) APPARATUS AND METHOD FOR CONTROLLING DISCONNECTOR OF ELECTRIC VEHICLE

(71) Applicants: Hyundai Motor Company, Seoul (KR); Kia Motors Corporation, Seoul (KR)

(72) Inventors: Woo Cheol Cho, Gyeonggi-do (KR); Won Seok Choi, Gyeonggi-do (KR); Kyung Hyun Lee, Gyeonggi-do (KR); Yoo Jung Han, Chungcheongnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 341 days.

(21) Appl. No.: 17/103,162

(22) Filed: Nov. 24, 2020

(65) Prior Publication Data
US 2021/0394738 A1    Dec. 23, 2021

(30) Foreign Application Priority Data
Jun. 22, 2020  (KR) .......................... 10-2020-0075887

(51) Int. Cl.
*B60W 20/15*   (2016.01)
*B60W 10/08*   (2006.01)
(Continued)

(52) U.S. Cl.
CPC ............ *B60W 20/15* (2016.01); *B60W 10/08* (2013.01); *B60W 30/18127* (2013.01);
(Continued)

(58) Field of Classification Search
CPC ................. B60W 20/15; B60W 10/08; B60W 30/18127; B60W 40/076; B60W 40/105;
(Continued)

(56) References Cited

U.S. PATENT DOCUMENTS

| 6,549,840 B1 * | 4/2003 | Mikami ................ B60K 6/365 |
| | | 903/910 |
| 7,376,503 B2 | 5/2008 | Suzuki et al. |

(Continued)

FOREIGN PATENT DOCUMENTS

| CN | 104340059 A | 2/2015 |
| CN | 108688646 | * 10/2018 ............ B60W 10/02 |

(Continued)

OTHER PUBLICATIONS

CN_108688646 For image and translation merged (Year: 2018).*

(Continued)

*Primary Examiner* — Joan T Goodbody
(74) *Attorney, Agent, or Firm* — Fox Rothschild LLP

(57) ABSTRACT

A disconnector control device and method for an electric vehicle are provided. The disconnector control device includes a disconnector that switches wheel driving manners and a processor that recognizes a driving condition of the vehicle. The processor also acquires at least one factor related to operation of the disconnector and operates the disconnector based on the acquired at least one factor.

14 Claims, 11 Drawing Sheets

(51) Int. Cl.
*B60W 30/18* (2012.01)
*B60W 40/076* (2012.01)
*B60W 40/105* (2012.01)
*B60W 40/114* (2012.01)

(52) U.S. Cl.
CPC ........ *B60W 40/076* (2013.01); *B60W 40/105* (2013.01); *B60W 40/114* (2013.01); *B60W 2510/083* (2013.01); *B60W 2510/18* (2013.01); *B60W 2520/28* (2013.01); *B60W 2520/40* (2013.01); *B60W 2540/18* (2013.01)

(58) Field of Classification Search
CPC ......... B60W 40/114; B60W 2510/083; B60W 2510/18; B60W 2520/28; B60W 2520/40; B60W 2540/18
See application file for complete search history.

(56) References Cited

U.S. PATENT DOCUMENTS

| | | |
|---|---|---|
| 9,266,522 B2 | 2/2016 | Kodama et al. |
| 2005/0173179 A1 | 8/2005 | Amanuma et al. |
| 2006/0231310 A1* | 10/2006 | Suzuki .................. B60T 8/1769 180/197 |
| 2015/0032335 A1* | 1/2015 | Kodama ............... B60W 30/02 701/42 |
| 2015/0328983 A1* | 11/2015 | Takaira ................ B60K 17/354 180/233 |
| 2018/0162349 A1 | 6/2018 | Chang et al. |

FOREIGN PATENT DOCUMENTS

| | | | |
|---|---|---|---|
| DE | 10049567 A1 | 10/2001 | |
| DE | 112017000006 | * 10/2017 | ......... B60K 23/0808 |
| EP | 2840002 A1 | 2/2015 | |
| JP | H 1-98030 U | 6/1989 | |
| JP | 2000-127790 A | 5/2000 | |
| JP | 2005-153569 A | 6/2005 | |
| JP | 2019188991 A | 10/2019 | |

OTHER PUBLICATIONS

DE_112017000006 For image and translation merged (Year: 2017).*
K. Smith et al., "Design and implementation of an autonomous hybrid vehicle," IEEE Africon '11, Victoria Falls, Zambia, 2011, pp. 1-6. (Year: 2011).*
K. Kim, J. Jeong, H. Kim, S. W. Cha and W. Lim, "Analysis of Vehicle Status in Various Driving Situations for a Separated Axle Torque Combination Parallel Hybrid System Using Forward Simulator," 2014 IEEE Vehicle Power and Propulsion Conference (VPPC), Coimbra, Portugal, 2014, pp. 1-4. (Year: 2014).*
Chinese Office Action for Chinese Patent Application No. 2020113365818 by China National Intellectual Property Administration, issued Apr. 22, 2025, 13 pages, with English translation.

* cited by examiner

APPARATUS AND METHOD FOR CONTROLLING DISCONNECTOR OF ELECTRIC VEHICLE

CROSS-REFERENCE TO RELATED APPLICATION

This application claims the benefit of priority to Korean Patent Application No. 10-2020-0075887, filed on Jun. 22, 2020, the entire contents of which are incorporated herein by reference.

TECHNICAL FIELD

The present disclosure relates to an apparatus and method for controlling a disconnector of an electric vehicle, and more particularly, to an apparatus and method that control engagement and disengagement of the disconnector based on factors affecting the driving conditions of the vehicle and the operation of the disconnector.

BACKGROUND

A disconnector system has been applied to eco-friendly vehicles such as electric vehicles and hybrid vehicles. The disconnector system refers to a device the reduces drag by controlling reverse driving force transferred from a motor to wheels. An electric vehicle with 4 wheel drive (4WD) is equipped with a disconnector on the front or rear wheels to transfer or control the driving force of the motor as needed. In other words, when the vehicle is accelerated or decelerated through the motor of a drive shaft equipped with the disconnector system, the disconnector is engaged to transfer a motor torque to the wheels, and when the motor of the drive shaft equipped with the disconnector system is not used, the disconnector is disengaged to reduce drag occurring in the motor and a reducer for example, motor back electromotive force and reducer drag.

When the vehicle is being driven in a state in which the disconnector is disengaged, fuel efficiency is improved due to reduction in drag, but when the disconnector is engaged for urgent vehicle control, it takes time to switch the operation mode of the disconnector from a disengaged state to an engaged state to deteriorate the performance of vehicle control.

SUMMARY

The present disclosure provides an apparatus and method for controlling a disconnector of an electric vehicle, which control engagement and disengagement of the disconnector based on factors affecting the driving conditions of the vehicle and the operation of the disconnector.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a disconnector control device for an electric vehicle may include a disconnector that switches wheel driving manners and a processor configured to detect a driving condition of the vehicle, acquire at least one factor related to operation of the disconnector, and operate the disconnector based on the acquired at least one factor. The driving condition may include one of a downhill driving condition, a turning driving condition, a constant-speed driving condition.

The processor may be configured to acquire a road surface slope, regenerative braking torque, and a difference in wheel speed between a front wheel and a rear wheel using at least one of a navigation device and a sensing device when the driving condition is the downhill driving condition. The processor may be configured to determine a score for each of the road surface slope, the regenerative braking torque, and the difference in the wheel speed between the front wheel and the rear wheel, calculate a first operation score, and in response to determining that the calculated first operation score is greater than or equal to a first reference score, engage the disconnector.

In addition, the processor may be configured to acquire a steering angle, a steering angular velocity, and a yaw rate error of the vehicle using at least one of a navigation device and a sensing device when the driving condition is the turning driving condition. The processor may be configured to determine a score for each of the steering angle, the steering angular velocity, and the yaw rate error of the vehicle, calculate a second operation score, and in response to determining that the calculated second operation score is greater than or equal to a second reference score, engage the disconnector. The processor may also be configured to determine whether a speed difference between a constant-speed driving vehicle speed and a first reference vehicle speed or a speed difference between the constant-speed driving vehicle speed and a second reference vehicle speed is within a critical vehicle speed range when the driving condition is the constant-speed driving condition.

The processor may be configured to perform adjustment to decrease the first reference vehicle speed based on an initial value of the first reference vehicle speed, a constant-speed holding time, and a constant-speed holding speed when a speed difference between the constant-speed driving vehicle speed and the first reference vehicle speed is within the critical vehicle speed range. The processor may be configured to perform adjustment to increase the second reference vehicle speed based on an initial value of the second reference vehicle speed, a constant-speed holding time, and a constant-speed holding speed when a speed difference between the constant-speed driving vehicle speed and the second reference vehicle speed is within the critical vehicle speed range.

The processor may additionally be configured to acquire an initial value of a reference torque, frequency of change in a required torque, and a high required torque holding time in a medium-speed section in response to determining that the constant-speed driving vehicle speed exceeds the first reference vehicle speed and is less than or equal to the second reference vehicle speed and a difference between a constant-speed driving torque and the reference torque is within a critical torque range. The processor may be configured to perform adjustment to decrease the reference torque based on the initial value of the reference torque, the frequency of change in the required torque, and the high required torque holding time in the medium-speed section.

According to another aspect of the present disclosure, a disconnector control method for an electric vehicle may include detecting a driving condition of the vehicle, acquiring at least one factor related to operation of a disconnector under the driving condition, determining an operation mode of the disconnector based on the at least one factor, and operating the disconnector according to the determination.

The detecting of the driving condition may include detecting one of a downhill driving condition, a timing driving condition, a constant-speed driving condition as the driving condition. The acquiring of the at least one factor may include acquiring a road surface slope, regenerative braking torque, and a difference in wheel speed between a front wheel and a rear wheel using at least one of a navigation device and a sensing device under the downhill driving condition.

The determining of the operation mode of the disconnector may include determining a score for each of the road surface slope, the regenerative braking torque, and the difference in the wheel speed between the front wheel and the rear wheel to calculate a first operation score, comparing the first operation score with a first reference score, and determining engagement of the disconnector in response to determining that the calculated first operation score is greater than or equal to the first reference score. The acquiring of the at least one factor may include acquiring a steering angle, a steering angular velocity, and a yaw rate error of the vehicle using at least one of a navigation device and a sensing device under the turning driving condition. The determining of the operation mode of the disconnector may include determining a score for each of the steering angle, the steering angular velocity, and the yaw rate error of the vehicle, to calculate a second operation score, comparing the second operation score with a second reference score, and determining engagement of the disconnector when the calculated second operation score is greater than or equal to the second reference score.

The acquiring of the at least one factor may include determining whether a speed difference between a constant-speed driving vehicle speed and a first reference vehicle speed is within a critical vehicle speed range under the constant-speed driving condition, determining whether a speed difference between the constant-speed driving vehicle speed and a second reference vehicle speed is within a critical vehicle speed range, and acquiring an initial value of the first reference vehicle speed or the second reference vehicle speed, a constant-speed holding time, a constant-speed holding speed in response to determining that the speed difference between the constant-speed driving vehicle speed and the first reference vehicle speed or the speed difference between the constant-speed driving vehicle speed and the second reference vehicle speed is within the critical vehicle speed range.

The determining of the operation mode of the disconnector may include performing adjustment to decrease the first reference vehicle speed based on the initial value of the first reference vehicle speed, the constant-speed holding time, and the constant-speed holding speed, and determining engagement or disengagement of the disconnector based on the adjusted first reference vehicle speed. The determining of the operation mode of the disconnector may include performing adjustment to increase the second reference vehicle speed based on the initial value of the second reference vehicle speed, the constant-speed holding time, and the constant-speed holding speed, and determining engagement or disengagement of the disconnector based on the adjusted second reference vehicle speed.

The acquiring of the at least one factor may include determining whether a difference between a constant-speed driving torque and a reference torque is within a critical torque range in response to determining that the constant-speed driving vehicle speed is greater than the first reference vehicle speed and is less than or equal to the second reference vehicle speed under the constant-speed driving condition, and acquiring an initial value of the reference torque, frequency of change in a required torque, a high required torque holding time in a medium-speed section when the difference between the constant-speed driving torque and the reference torque is within the critical torque range. The determining of the operation mode of the disconnector may include performing adjustment to decrease the reference torque based on the initial value of the reference torque, the frequency of change in the required torque, and the high required torque holding time in the medium-speed section.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
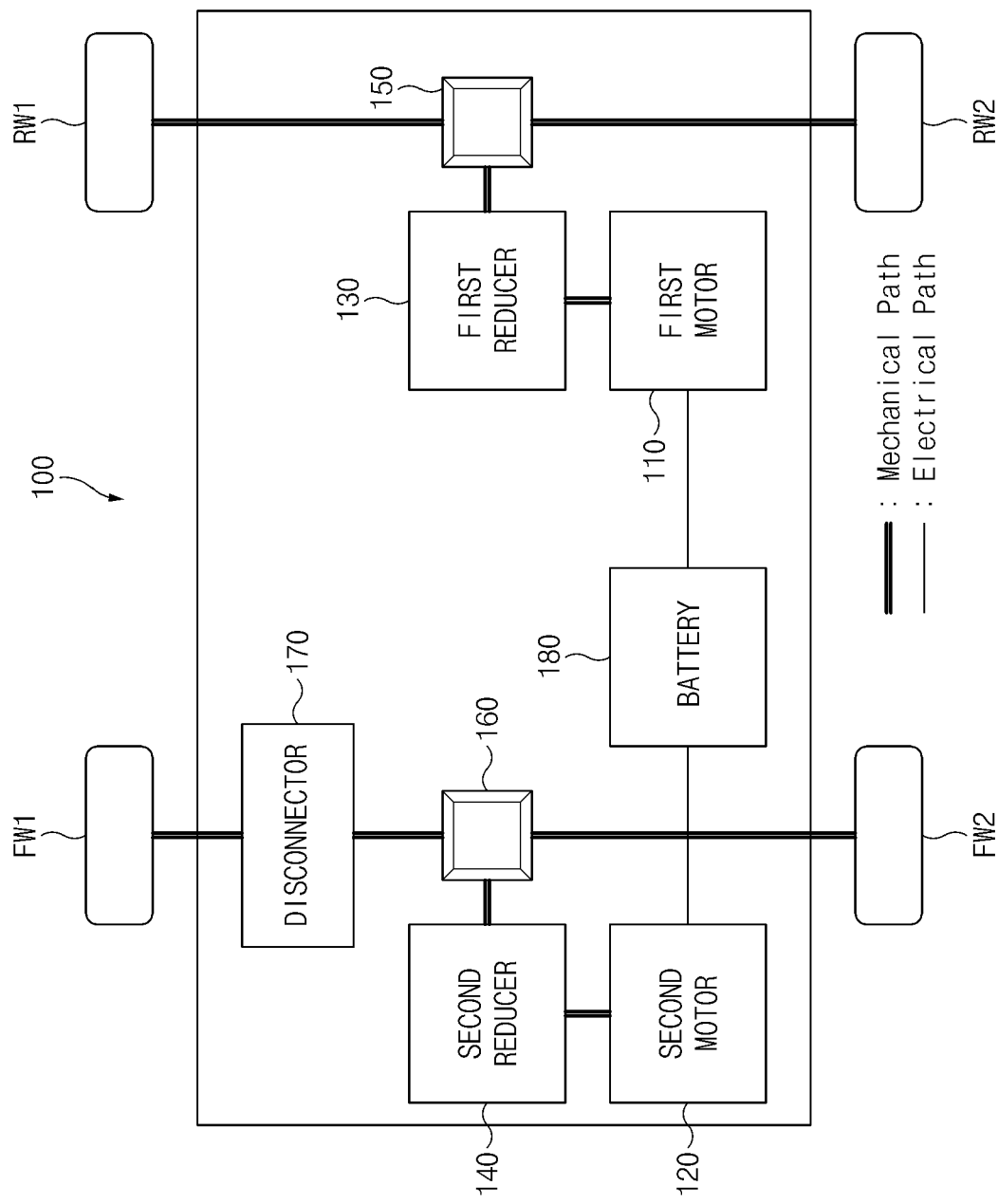
FIG. 1 is a block diagram showing an electric vehicle related to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram showing an electric vehicle related to the present disclosure. Referring to FIG. 1, an electric vehicle (hereinafter, a vehicle) 100 may include a first motor 110, a second motor 120, a first reducer 130, a second reducer 140, a first differential gear 150, a second differential gear 160, a disconnector 170 and a battery 180.

The first motor 110 and the second motor 120 may be driving devices that convert electric energy into kinetic energy to generate driving force required to drive wheels FW1, FW2, RW1, and RW2. The first motor 110 and the second motor 120 may adjust an output torque by adjusting a rotation direction, a rotation speed (e.g., revolution per minute, RPM) or the like according to an instruction of a motor control unit (MCU). The first motor 110 may be configured to supply driving force to rear wheels RW1 and RW2, and the second motor 120 may be configured to supply driving force to front wheels FW1 and FW2. The first motor 110 and the second motor 120 may be used as generators that charge the battery 180 by generating a back electromotive force when a state of charge (SOC) is insufficient or in the case of regenerative braking.

The first reducer 130 and the second reducer 140 may be a type of transmission designed to efficiently transmit driving force generated by the motors 110 and 120 to the wheels FW1, FW2, RW1 and RW2. The first reducer 130 may be configured to adjust a rotational speed (motor torque) of the first motor 110 and transfer the rotational speed to the rear wheels RW1 and RW2, and the second reducer 140 may be configured to adjust a rotational speed (motor torque) of the second motor 120 and transfer the rotational speed to the front wheels FW1 and FW2.

The first differential gear 150 and the second differential gear 160 may be connected to output terminals of the first reducer 130 and the second reducer 140, respectively, and distribute and transfer the output torque of the first reducer 130 and the second reducer 140 to the wheels FW1, FW2, RW1 and RW2. The first differential gear 150 may distribute and transfer the driving force generated by the first motor 110 to the both rear wheels RW1 and RW2. In addition, the second differential gear 160 may distribute and transfer the driving force generated by the second motor 120 to the both front wheels FW1 and FW2.

The disconnector 170 may be mounted on an axle shaft and may be disposed between the differential gear 150 or 160 and the wheels FW1, FW2, RW1, or RW2. In this exemplary embodiment, for convenience of understanding the description, the disconnector 170 is described as being disposed on a front axle drive shaft as an example, but may also be disposed on a rear axle drive shaft. The disconnector 170 may be configured to transfer or cut off the driving force from the second motor 120 and the second reducer 140 to the front wheels FW1 and FW2. The disconnector 170 may be engaged or disengaged according to an instruction of a disconnector control device 240 to be described later. When the disconnector 170 is engaged, the vehicle 100 may operate in a four-wheel drive (4WD) manner, that is, an all-wheel drive (AWD) manner. In addition, when the disconnector 170 is disengaged, the vehicle 100 may operate in a rear-wheel drive manner.

The battery 180 may be configured to supply power required to drive the vehicle, and may be implemented with a high voltage battery. The battery 180 may be configured to supply power to the first motor 110 and the second motor 120. The battery 180 may be charged by regenerative energy generated by the motors 110 and 120. Although not shown in the drawing, the vehicle 100 may include a Battery Management System (BMS) configured to monitor the state of charge and discharge of the battery 180, detect an abnormality occurring in the battery 180, and takes a role of taking appropriate measures. In addition, a power converter configured to convert and supply a voltage output from the battery 180 to a motor driving voltage may be further provided in the vehicle 100. The power converter may include an inverter configured to convert direct current (DC) power of the battery 180 into alternating current (AC) power to adjust a speed of the motors 110 and 120 and a low voltage DC-DC converter (LDC) configured to convert a high voltage output from the battery 180 to a low voltage to supply the low voltage to an electric system.

Figure 2:
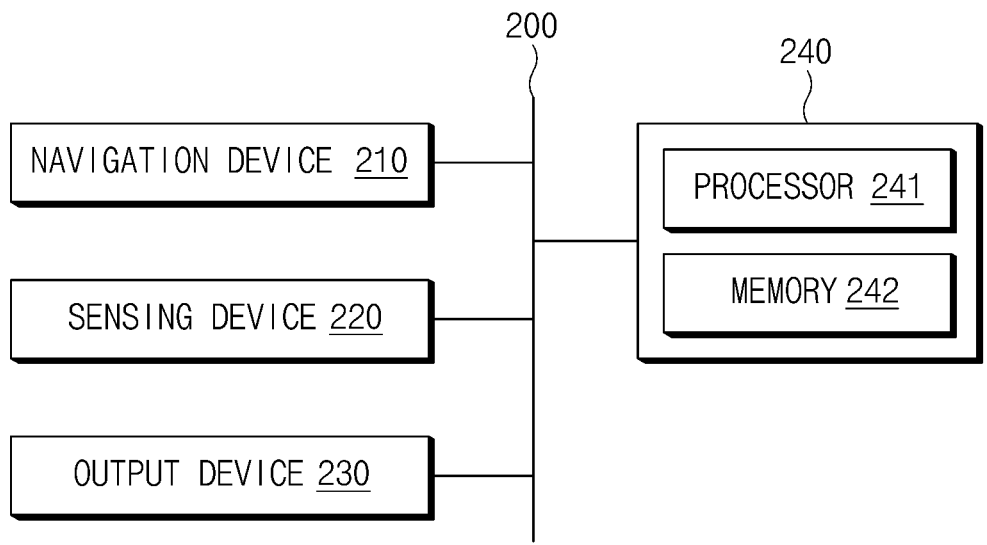
FIG. 2 is a block configuration diagram of an electric vehicle according to an exemplary embodiment of the present disclosure.
Figure 3:
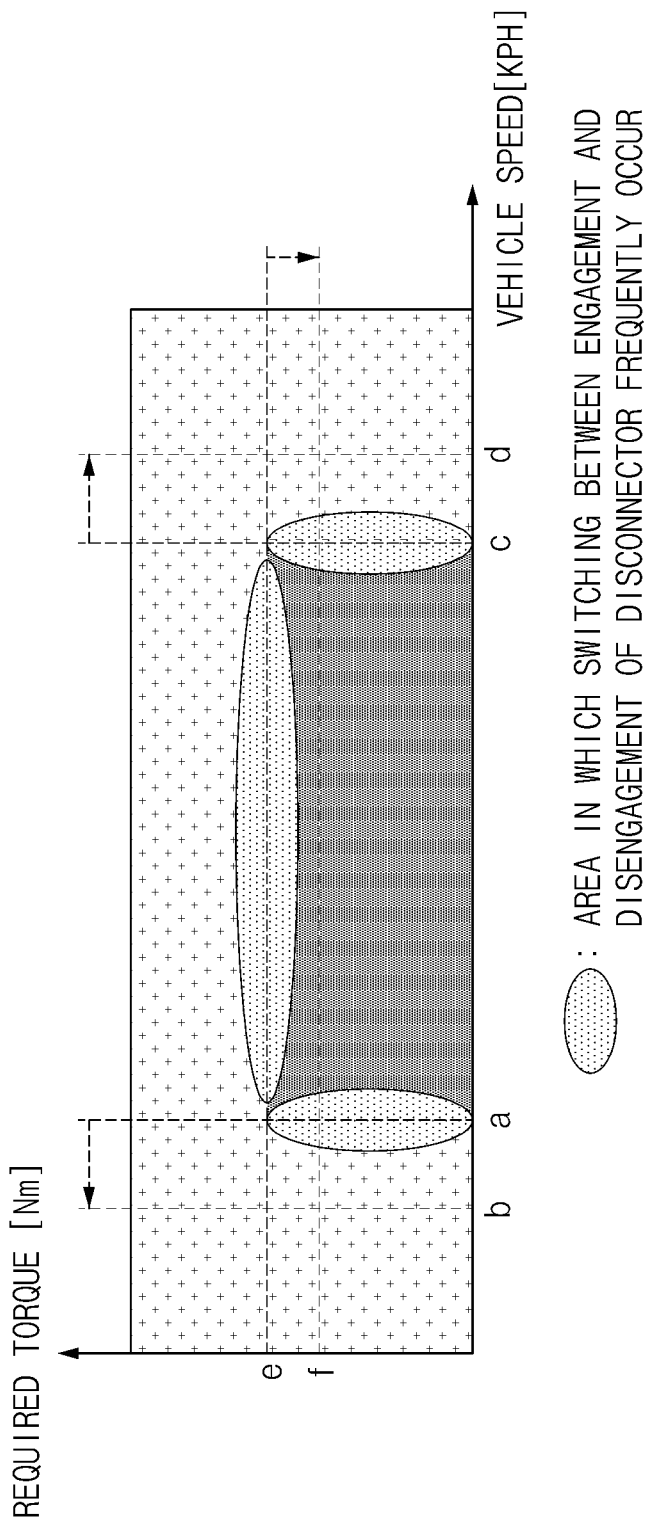
FIG. 3 is a graph for describing a strategy for engaging and disengaging a disconnector in constant-speed driving, according to an exemplary embodiment of the present disclosure.
Figure 4A:
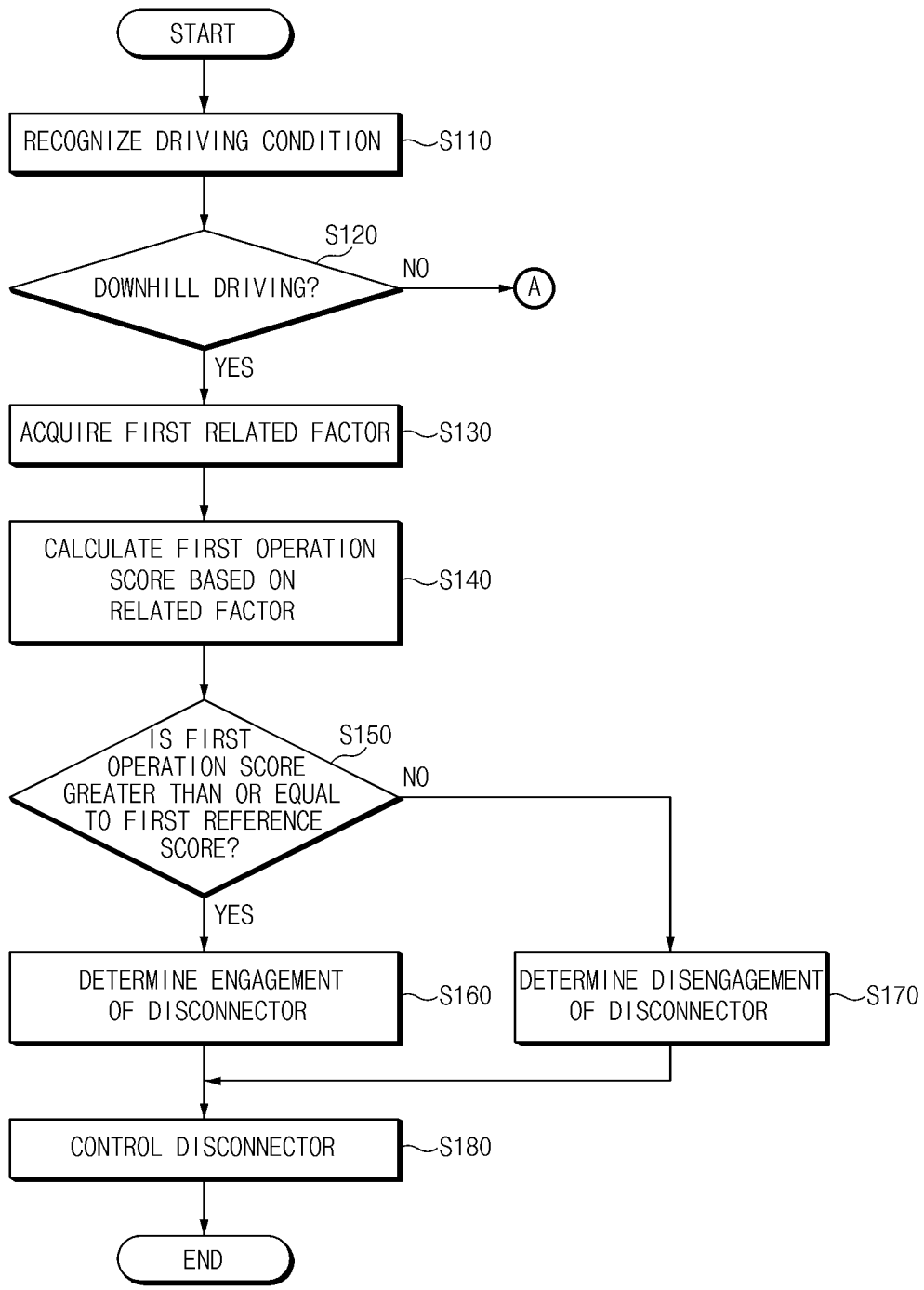
FIGS. 4A to 4D show a flowchart of a method for controlling a disconnector of an electric vehicle according to another exemplary embodiment of the present disclosure.
Figure 4B:
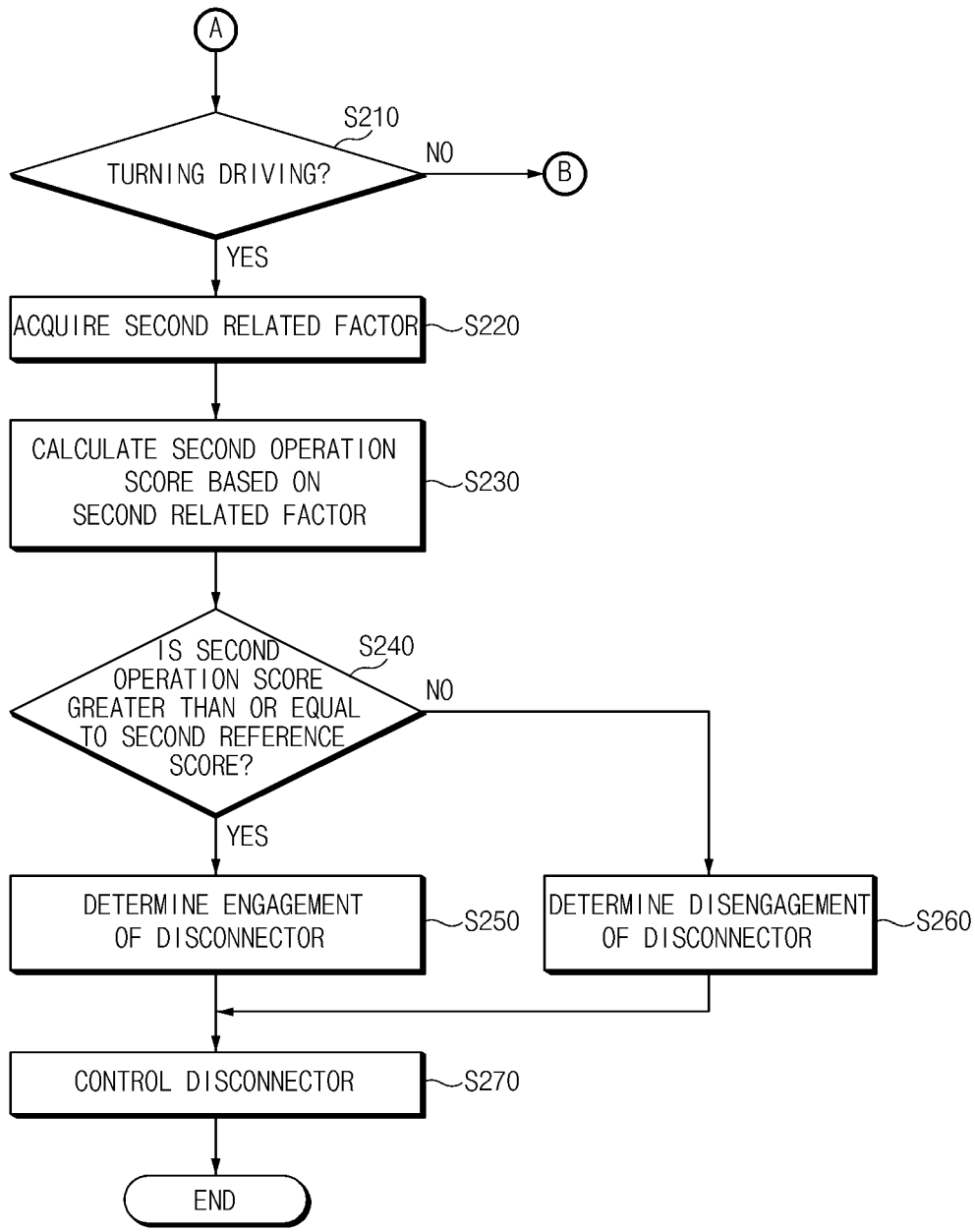
Figure 4C:
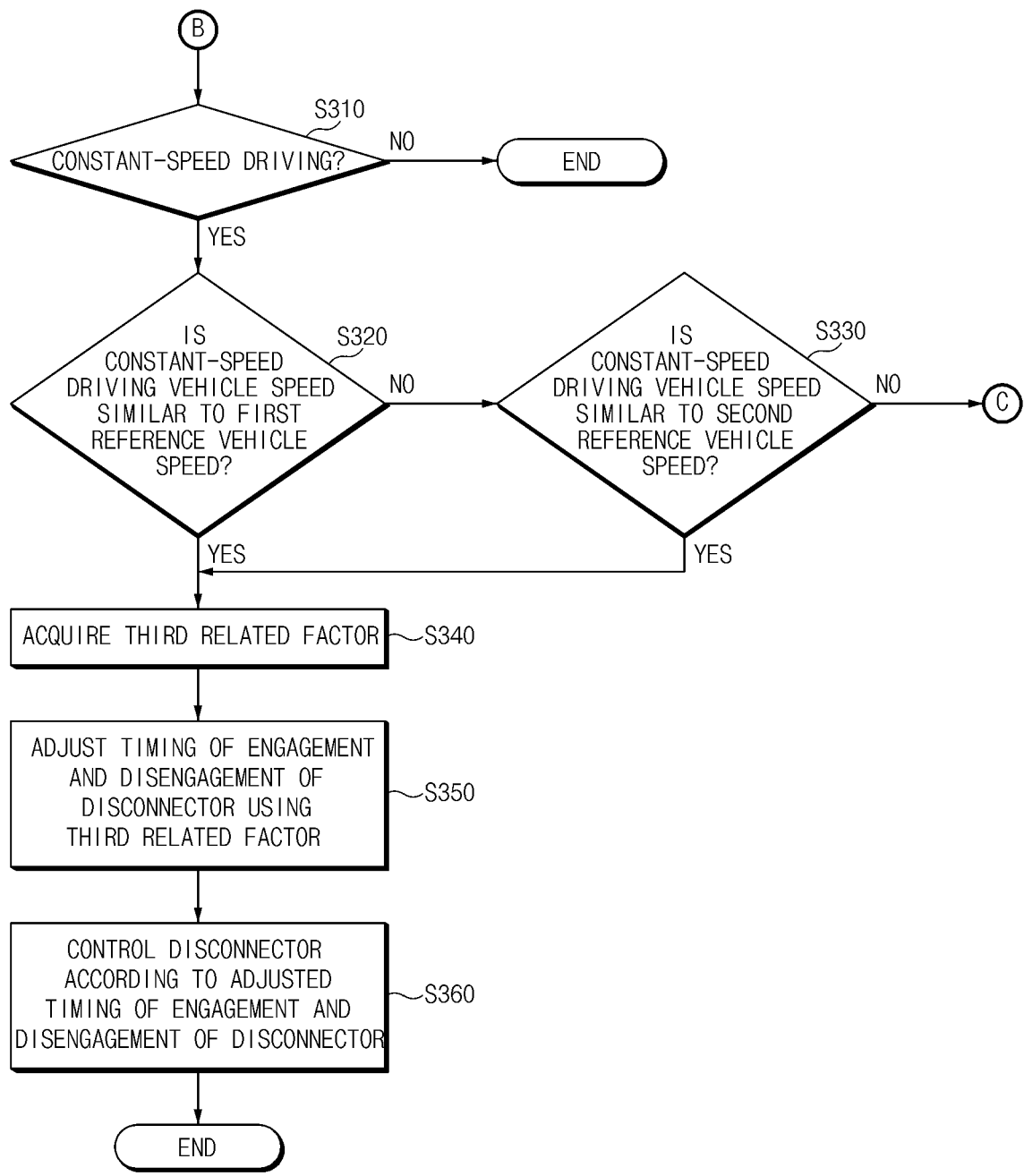
Figure 4D:
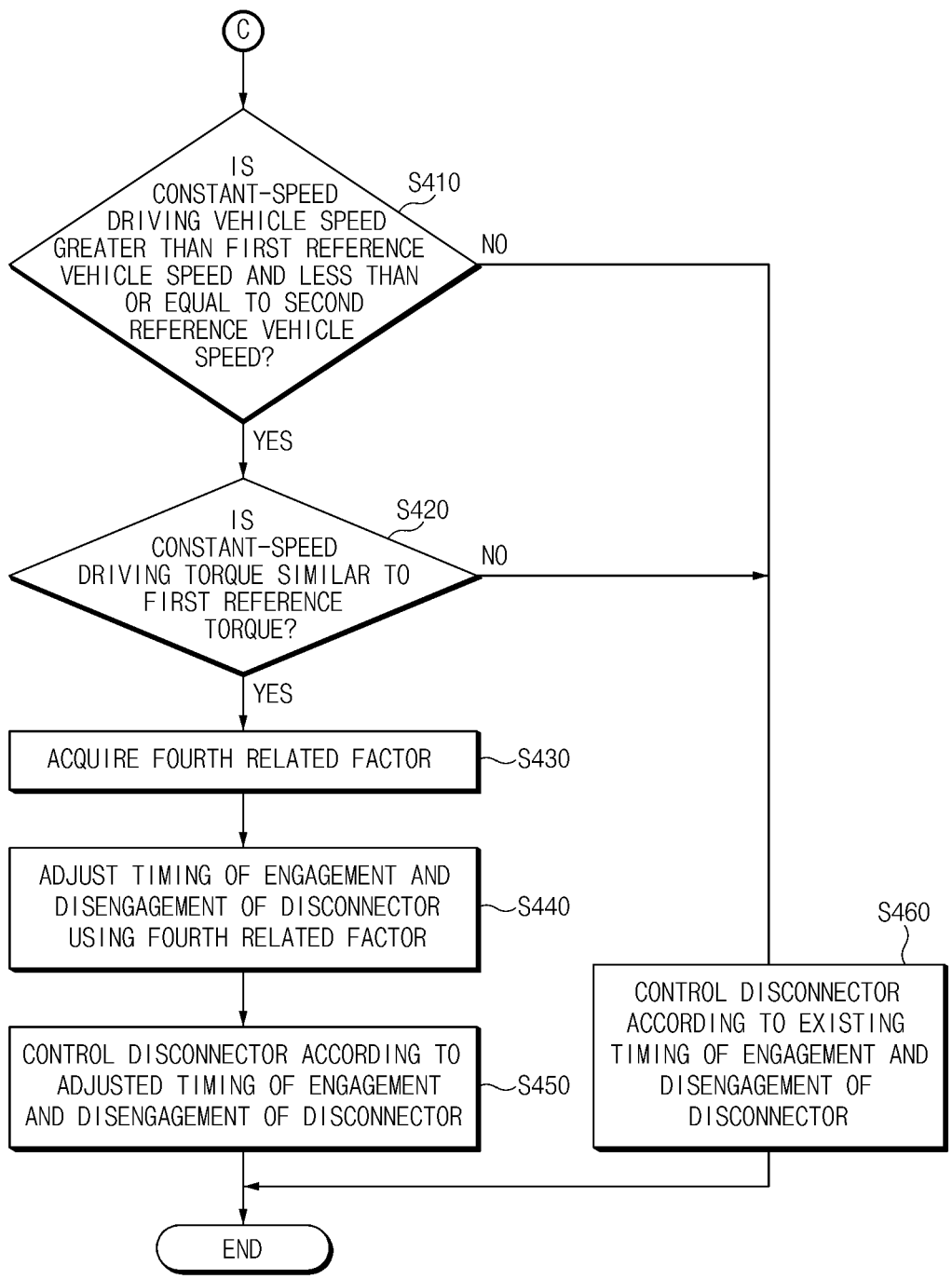

FIG. 2 is a block configuration diagram of an electric vehicle according to an exemplary embodiment of the present disclosure, and FIG. 3 is a graph for describing a strategy for engaging or disengaging a disconnector in constant-speed driving, according to an exemplary embodiment of the present disclosure. Referring to FIG. 2, the electric vehicle (hereinafter, the vehicle) 100 may include a navigation device 210, a sensing device 220, an output device 230, and the disconnector control device 240, which are connected via a bus 200. The bus 200 may be implemented with, for example, a Controller Area Network (CAN), a Media Oriented Systems Transport (MOST) network, a Local Interconnect Network (LIN), Ethernet, and/or an X-by-Wire (Flexray).

When a destination is set, the navigation device 210 may be configured to search for and guide a driving route to the destination. When searching for the driving route, the navigation device 210 may reflect real-time traffic information to search for an optimal route. The navigation device 210 may be configured to transmit road information, such as a road slope (gradient), a road curvature (turning radius and/or turning angle), and/or an accident black spot, to the disconnector control device 240. The navigation device 210 may include a memory configured to store map data, a Global Positioning System (GPS) receiver configured to measure a vehicle location, a communication module configured to receive traffic information from the outside, and a processor configured to search for a driving route and perform route guidance along the driving route, which are not shown in the drawings.

The sensing device 220 may be configured to acquire driving information using at least one sensor mounted on the vehicle 100. The sensing device 220 may use at least one of sensors such as a steering angle sensor, a wheel speed sensor, a vehicle speed sensor, a 3-axis accelerometer, an Inertial Measurement Unit (IMU), an accelerator pedal position sensor, an image sensor, a rain sensor, a yaw rate sensor, and/or a temperature sensor. The driving information may include a vehicle speed, a wheel speed, a motor rotational speed (revolution per minute, RPM), a road slope (gradient), a turning angle (road curvature), a yaw rate, a rainfall and temperature, and the like.

The output device 230 may be configured to output various types of information, such as disconnector status information (e.g., engagement or disengagement), a motor RPM, a vehicle speed, a distance to empty (DTE), and/or warning. The output device 230 may include a display, a speaker, a tactile signal output device (e.g., a vibrator), and the like. The display may include at least one of a liquid crystal display (LCD), a thin film transistor liquid crystal display (TFT-LCD), an organic light-emitting diode (OLED) display, a flexible display, a 3D display, a transparent display, a head-up display (HUD), a touch screen, and a cluster.

The disconnector control device 240 may be configured to detect a current driving condition of the vehicle 100 and acquire at least one factor related to the operation of the disconnector 170 under the corresponding driving condition. The disconnector control device 240 may switch wheel driving manners by engaging or disengaging the disconnector 170 based on the at least one factor acquired. The disconnector control device 240 may include a processor 241 and a memory 242. The processor 241 may be configured to execute overall operation of the disconnector control device 240 and be implemented with at least one of an application specific integrated circuit (ASIC), a digital signal processor (DSP), a programmable logic device (PLD), field programmable gate array (FPGAs), a central processing unit (CPU), microcontrollers, and microprocessors. The memory 242 may be a non-transitory storage medium that stores instructions to be executed by the processor 241.

The memory 242 may be configured to store input data and/or output data generated according to the operation of the processor 241. The memory 242 may be configured to store a variety of settings information. The memory 242 may be implemented with at least one of storage media, such as a flash memory, a hard disk, an SD card (Secure Digital Card), a random access memory (RAM), a static random access memory (SRAM), a read only memory (ROM), a Programmable Read Only Memory (PROM), an Electrically Erasable and Programmable ROM (EEPROM), an Erasable and Programmable ROM (EPROM), a register and a cache memory.

The processor 241 may be configured to recognize a driving condition (driving situation) of the vehicle 100 through the navigation device 210 and/or the sensing device 220. The driving condition may be a situation in which it is necessary to adjust timing of engagement and disengagement the disconnector 170, and may be specified into a downhill (downhill road) driving, turning driving and constant-speed driving. In other words, the driving condition may refer to a situation in which there is a possibility that switching between the engagement and disengagement of the disconnector 170 frequently occurs. The processor 241 may be configured to identify factors (related factors) affecting the operation (engagement or disengagement) of the disconnector 170 under the detected driving condition and determine a disconnector control strategy based on a result of the identification. The processor 241 may be configured to operate the disconnector 170 according to the determined disconnector control strategy.

Hereinafter, a method for determining a disconnector control strategy for each driving condition will be described in detail.

Downhill Driving Conditions

As shown in FIG. 1, when the vehicle 100 on which the disconnector 170 is mounted on the front wheels FW1 and FW2 drives a downhill road while the disconnector 170 is disengaged, the center of gravity of the vehicle 100 may move to the front wheels FW1 and FW2 and therefore, the traction force of the rear wheels RW1 and RW2 may be lowered, thus causing the rear wheels RW1 and RW2 to easily slip. Accordingly, it is necessary to engage the disconnector 170 at an early stage to distribute regenerative braking of the front and rear wheels.

Accordingly, the processor 241 may be configured to acquire a road slope, a regenerative braking torque, and/or a difference in wheel speed between the front wheels and rear wheels as a related factor (a first related factor) when the vehicle 100 needs to perform the downhill driving. The processor 241 may be configured to receive the road slope from the navigation device 210 or measure the road slope using the sensing device 220. Additionally, the processor 241 may be configured to estimate the regenerative braking torque based on the road slope (road surface slope) and a vehicle speed. The difference in wheel speed between the front wheels FW1 and FW2 and the rear wheels RW1 and RW2 may be calculated using wheel speed sensors disposed on the front wheels FW1 and FW2 and the rear wheels RW1 and RW2.

The processor 241 may be configured to score the acquired factors individually. In particular, the processor 241 may be configured to determine a score for each factor by referring to a score calculation reference table as shown in [Table 1] stored in the memory 242 in advance. The processor 241 may be configured to calculate (compute) a first operation score by summing up scores for predetermined factors. The processor 241 may then be configured to determine the early engagement of the disconnector 170 in response to determining that the calculated first operation score is greater than or equal to a first reference score and determine the disengagement of the disconnector 170 in response to determining that the calculated first operation score is less than the first reference score.

For example, when the road slope is −10%, the regenerative braking torque is 100 Nm, and the difference in wheel speed between the front wheels and the rear wheels is 2.5 kph, the processor 241 may be configured to determine 5 points, 0 points, and 5 points for the factors respectively and calculate the sum of the determined scores, that is, 10 points. The processor 241 may be configured to determine the engagement of the disconnector since the calculated sum of the scores, 10 points is greater than or equal to 10 points which is the reference score.

vehicle 100 as a related factor (second related factor). The processor 241 may be configured to estimate the steering angle and the steering angular speed for turning based on road curvature (turning radius). In particular, the road curvature may be provided from the navigation device 210 or may be measured using the sensing device 220. In addition, the processor 241 may be configured to identify the yaw rate error of the vehicle 100 using a steering angle sensor, a yaw rate sensor, or the like.

The processor 241 may be configured to score the acquired factors individually. In particular, the processor 241 may be configured to determine a score for each factor by referring to a score calculation reference table as shown in [Table 2] stored in the memory 242 in advance. The processor 241 may be configured to calculate (compute) a second operation score by summing up scores for predetermined factors. The processor 241 may be configured to determine the early engagement of the disconnector 170 in response to determining that the calculated second operation score is greater than or equal to a second reference score (e.g., 10 points) and determine the disengagement of the disconnector 170 in response to determining that the calculated second operation score is less than the second reference score.

For example, when the steering angle is 30 degrees, the steering angular speed is 60 deg/s, and the yaw rate error is 2.5 deg/s, the processor 241 may be configured to determine

TABLE 1

| Road surface slope [%] | Regenerative braking torque [Nm] | Difference in wheel speed between front wheel and rear wheel [kph] | Engagement or disengagement of disconnector |
|---|---|---|---|
| 0 (0 points) | 100 (0 points) | 0 (0 points) | Disengagement |
|  |  | 2.5 (5 points) | Disengagement |
|  |  | 5 (10 points) | Engagement |
|  | 200 (5 points) | 0 (0 points) | Disengagement |
|  |  | 2.5 (5 points) | Engagement |
|  |  | 5 (10 points) | Engagement |
| −10 (5 points) | 100 (0 points) | 0 (0 points) | Disengagement |
|  |  | 2.5 (5 points) | Engagement |
|  |  | 5 (10 points) | Engagement |
|  | 200 (5 points) | 0 (0 points) | Engagement |
|  |  | 2.5 (5 points) | Engagement |
|  |  | 5 (10 points) | Engagement |
| −10 (10 points) | 100 (0 points) | 0 (0 points) | Engagement |
|  |  | 2.5 (5 points) | Engagement |
|  |  | 5 (10 points) | Engagement |
|  | 200 (5 points) | 0 (0 points) | Engagement |
|  |  | 2.5 (5 points) | Engagement |
|  |  | 5 (10 points) | Engagement |

Turning driving conditions

In the case of a vehicle with rear-wheel drive, the tendency of oversteer may appear in turning of the vehicle, and in the case of a vehicle with front-wheel drive, the tendency of understeer may appear in turning of the vehicle, but, in the case of a vehicle with four-wheel drive, it may be possible to implement a neutral steer by distributing driving force to the front and rear wheels in turning of the vehicle. Therefore, when the disconnector 170 of the vehicle 100 is disengaged, that is, when the engagement of the disconnector is delayed during emergency turning while the vehicle is driven in the two-wheel drive mode, it is difficult to implement a neutral steer, thus deteriorating turning performance. Accordingly, it may be necessary to engage the disconnector 170 early in turning of the vehicle.

Accordingly, when the vehicle 100 needs to turn, the processor 241 may be configured to acquire a steering angle, a steering angular velocity, and/or a yaw rate error of the 0 points, 5 points, and 10 points as the scores for the factors respectively, and calculate the sum of the determined scores, that is, 15 points. The processor 241 may be configured to determine the engagement of the disconnector because the calculated sum of the scores is greater than or equal to 10 points which is the reference score.

TABLE 2

| steering angle [Deg] | steering angular speed [Deg/s] | yaw rate error [Deg/s] | Engagement or disengagement of disconnector |
|---|---|---|---|
| 30 (0 points) | 30 (0 points) | 0 (0 points) | Disengagement |
|  |  | 1.5 (5 points) | Disengagement |
|  |  | 2.5 (10 points) | Engagement |

TABLE 2-continued

| steering angle [Deg] | steering angular speed [Deg/s] | yaw rate error [Deg/s] | Engagement or disengagement of disconnector |
|---|---|---|---|
| | 60 (5 points) | 0 (0 points) | Disengagement |
| | | 1.5 (5 points) | Engagement |
| | | 2.5 (10 points) | Engagement |
| 60 (5 points) | 30 (0 points) | 0 (0 points) | Disengagement |
| | | 1.5 (5 points) | Engagement |
| | | 2.5 (10 points) | Engagement |
| | 60 (5 points) | 0 (0 points) | Engagement |
| | | 1.5 (5 points) | Engagement |
| | | 2.5 (10 points) | Engagement |
| 90 (10 points) | 30 (0 points) | 0 (0 points) | Engagement |
| | | 1.5 (5 points) | Engagement |
| | | 2.5 (10 points) | Engagement |
| | 60 (5 points) | 0 (0 points) | Engagement |
| | | 1.5 (5 points) | Engagement |
| | | 2.5 (10 points) | Engagement |

Constant-speed driving conditions-low speed or high speed

In the case of a dual motor electric vehicle 100 equipped with the disconnector 170, the second motor 120 connected to the disconnector 170 cannot be used when the disconnector 170 is not engaged, thereby no high output being achieved. Accordingly, it may be necessary to determine the timing of engagement and disengagement of the disconnector 170 based on a driver's required torque (that is, the amount of pressure on an accelerator pedal) and the vehicle speed. In other words, when the driver engages the accelerator pedal a lot, the disconnector 170 may be engaged to achieve a high output, and when the driver engages the accelerator pedal a little, the disconnector 170 may be disengaged to reduce drag and enhance fuel efficiency. However, when the timing of the engagement and disengagement of the disconnector 170 according to the driver's required torque and the vehicle speed is fixed, the engagement and disengagement of the disconnector 170 may be frequently generated during constant-speed driving at the timing of engagement and disengagement the disconnector.

As described above, when the engagement and disengagement of the disconnector 170 is frequently generated, the energy consumption used for switching between the engagement and disengagement of the disconnector 170 may increase to reduce fuel efficiently and the maximum output by the motor may frequently change to cause discomfort to the driver. To prevent what is described above, it may be necessary to change the timing of engagement and disengagement of the disconnector 170 according to the driver's propensity.

Accordingly, the processor 241 may be configured to identify the constant-speed driving speed of the vehicle 100 during constant-speed driving. The processor 241 may be configured to compare a constant-speed driving speed with a first reference vehicle speed and a second reference vehicle speed. In particular, the first reference vehicle speed and the second reference vehicle speed may be vehicle speeds that are references for determining the engagement and disengagement of the disconnector 170, and correspond to the timing of the engagement and disengagement of the disconnector 170.

The first reference vehicle speed may be less than the second reference vehicle speed. As a result of the comparison, the processor 241 may be configured to determine whether the difference between the speed in the constant-speed driving and the first reference vehicle speed is within a critical range (e.g., about −10 kph or more and 10 kph or less). Further, the processor 241 may be configured to determine whether the difference between the constant-speed driving speed and the second reference vehicle speed is within a critical range as a result of the comparison. The critical range may be set in advance by a system user together with the first reference vehicle speed and the second reference vehicle speed.

The processor 241 may be configured to acquire an initial value of the first reference vehicle speed and/or the second reference vehicle speed, that is, a current set value, a constant-speed holding time and a constant-speed holding speed, as related factors (third related factors) in response to determining that the difference between the constant-speed driving speed and the first reference vehicle speed or the difference between the constant-speed driving speed and the second reference vehicle speed is within the critical range (critical vehicle speed range). The processor 241 may be configured to identify the driver's propensity by using the acquired related factors and adjust the timing of the engagement and disengagement of the disconnector 170. In other words, the processor 241 may be configured to adjust the first reference vehicle speed and/or the second reference vehicle speed based on the acquired related factors.

More specifically, referring to FIG. 3, when the constant-speed driving speed (constant-speed driving vehicle speed) of the vehicle 100 is similar to the initial value "a" of the first reference vehicle speed, the switching between the engagement and disengagement of the disconnector 170 may frequently occur, deteriorating fuel efficiency. Accordingly, the processor 241 may be configured to change the first reference vehicle speed from "a" to "b" using the following Equation 1 to allow the vehicle 100 to drive in the two-wheel drive manner, improving fuel efficiency. The first reference vehicle speed is the upper limit vehicle speed of a low-speed section.

$$b = a - (a' - a) \cdot \alpha \cdot t_1 \qquad \text{Equation 1}$$

wherein "b" is the first reference vehicle speed changed in the low-speed section, "a" is the initial first reference vehicle speed in the low-speed section, "a'" is the constant-speed holding vehicle speed in the low-speed section, "α" is a weight of the engagement of the disconnector in the low-speed section, and "t1" is the constant-speed holding time in the low-speed section.

When the constant-speed driving speed of the vehicle is similar to the initial value "c" of the second reference vehicle speed, the switching between the engagement and disengagement of the disconnector 170 may frequently occur, deteriorating fuel efficiency. Accordingly, the processor 241 may be configured to change the second reference vehicle speed from "c" to "d" using the following Equation 2 to allow the vehicle 100 to drive in the two-wheel drive manner, improving fuel efficiency. The second reference vehicle speed is the lower limit vehicle speed of a high-speed section.

$$d = c - (c' - c) \cdot \beta \cdot t_2 \qquad \text{Equation 2}$$

wherein "d" is the second reference vehicle speed changed in the high-speed section, "c" is the initial second reference vehicle speed in the high-speed section, "c'" is the constant-speed holding vehicle speed in the high-speed section, "β" is a weight of the engagement of the disconnector in the high-speed section, and "t2" is the constant-speed holding time in the high-speed section.

Thereafter, the processor may be configured to engage or disengage the disconnector 170 according to the constant-speed driving speed based on the changed first reference vehicle speed or second reference vehicle speed.

Constant-Speed Driving Conditions-Medium Speed

When the constant-speed driving vehicle speed is in a medium-speed section, that is, is greater than the first reference vehicle speed and less than or equal to the second reference vehicle speed, the processor 241 may be configured to identify the driver's required torque. When a high required torque occurs for acceleration or overtaking in the medium-speed section, 4WD driving may be essential for a high output, so that it may be necessary to engage the disconnector 170 to enable the 4WD driving. On the other hand, when a low required torque occurs in the medium-speed section, it may be necessary to disengage the disconnector 170 to enable 2WD driving to improve fuel efficiency through a reduction in drag. In particular, when the timing of the engagement and disengagement of the disconnector 170 is fixed, the energy consumption used for switching between the engagement and disengagement of the disconnector 170 may increase to reduce fuel efficiently and the maximum output by the motor may frequently change to cause discomfort to the driver. To prevent what is described above, it may be necessary to change the timing of engagement and disengagement of the disconnector 170 according to the driver's preference.

The processor 241 may be configured to compare a constant-speed driving torque with a preset reference torque. When the difference between the constant-speed driving torque and the reference torque is within a critical range, the processor 241 may be configured to acquire the initial value of the reference torque, the frequency of change in the required torque, and the high required torque holding time in the medium-speed section as a related factor (fourth related factor).

Referring to FIG. 3, when the constant-speed driving torque is similar to the initial value "e" of the reference torque, the processor 241 may change the reference torque from "e" to "f" using Equation 3.

$$f=e-(e'-e)\cdot\gamma\cdot t_3 \quad \text{Equation 3}$$

wherein "f" is the changed reference torque, "e" is the initial reference torque, "e'" is the medium-speed holding torque, γ is the frequency of engagement (the frequency of change of the required torque), and "t3" is the high required torque holding time in the medium-speed section. Thereafter, the processor may engage or disengage the disconnector 170 according to the constant-speed driving torque based on the changed reference torque.

Control of Engagement and Disengagement of Disconnector Due to External Factors When an external factor suddenly changes, such as a sudden change in weather, a change in road conditions, or an accident black spot while the vehicle 100 is driving in a state in which the disconnector 170 is disengaged, the engagement of the disconnector may take time, failing to secure safety during the engagement. Accordingly, a control strategy may be required to recognize the external factors in advance and engage the disconnector. Accordingly, the processor 241 may be configured to recognize road information (e.g., turning, uphill, and/or downhill), information on an accident black spot and the like. The processor 241 may be configured to engage the disconnector 170 when the road gradient is greater than the reference gradient, and maintain the disengagement of the disconnector 170 when the road gradient is less than or equal to the reference gradient.

Further, the processor 241 may be configured to maintain the disengagement of the disconnector 170 when the turning radius of the road is greater than the reference radius, and engage the disconnector 170 when the turning radius of the road is less than or equal to the reference radius. The processor 241 may be configured to engage the disconnector 170 when the vehicle 100 is to enter an accident black spot, and maintain the disengagement of the disconnector 170 when the vehicle 100 is to enter no accident black spot.

In addition, the processor 241 may be configured to control the engagement and disengagement of the disconnector 170 using a rain sensor, an outside temperature sensor, and the like. The processor 241 may be configured to engage the disconnector 170 when rainfall is detected by the rain sensor, and maintain the disengagement of the disconnector 170 when rainfall is not detected. In addition, the processor 241 may be configured to engage the disconnector 170 when the outside temperature measured by the outside temperature sensor is less than or equal to a reference temperature (e.g., 0° C.), and maintain the disengagement of the disconnector 170 when the outside temperature is greater than the reference temperature.

Disconnect Connector Disengagement Suspension Control

When the disconnector 170 is engaged, it may be possible to achieve a high output and driving stability through 4WD driving, but when the disconnector 170 is disengaged immediately at disengagement timing during the engagement of the disconnector 170, fuel efficiency may be deteriorated due to frequent engagement and disengagement. In addition, it may be hard to rapidly respond to various external factors, such as a change in road situations, rapid turning, and/or a downhill or an uphill at the moment when the disconnector 170 is disengaged. Accordingly, when the disconnector 170 is disengaged, it may be required to perform control to suspend the disengagement of the disconnector 170.

Accordingly, when a signal (disengagement signal) instructing the disengagement of the disconnector is generated while the disconnector 170 is engaged, the processor 241 may suspend disengagement of the disconnector until a predetermined time has elapsed and/or the vehicle has moved a predetermined distance. As the vehicle drives on a uphill, a downhill, a turned road, and/or a low friction road in a state where the disengagement of the disconnector 170 is suspended, the processor 241 may maintain the engagement of the disconnector 170 until the next disengagement signal is generated when a signal (engagement signal) indicating the engagement of the disconnector 170 is generated.

FIGS. 4A to 4D show a flowchart of a method for controlling a disconnector of an electric vehicle according to another exemplary embodiment of the present disclosure; The processor 241 of the disconnector control device 240 may be configured to recognize driving conditions of the vehicle 100 (S110). The processor 241 may be configured to detect the driving conditions through the navigation device 210 and/or the sensing device 220. The driving condition may be a situation in which it is necessary to adjust timing of engagement and disengagement the disconnector 170, and may be specified into a downhill driving, turning driving, and constant speed driving.

The processor 241 may be configured to determine whether the driving condition of the vehicle 100 is the downhill driving (S120). In other words, the processor 241 may be configured to determine whether the vehicle 100 satisfies a downhill driving condition. The processor 241 may be configured to acquire a first related factor when the vehicle 100 satisfies the downhill driving condition (S130). The first related factor may include a road slope, a regenerative braking torque and/or a difference in wheel speed between front wheels and rear wheels. The processor 241 may be configured to acquire a first related factor using the navigation device 210 and/or the sensing device 220.

The processor 241 may be configured to calculate an operation score based on the first related factor (S140). The processor 241 may be configured to determine a score for each factor by referring to a score calculation table stored in the memory 242. Additionally, the processor 241 may be configured to calculate a first operation score by summing up scores for determined factors. The processor 241 may be configured to determine whether the calculated operation score is greater than or equal to a first reference score (S150). Herein, the first reference score may be a value set in advance by a system designer.

In response to determining that the calculated first operation score is greater than or equal to the first reference score, the processor 241 may be configured to determine the engagement of the disconnector (S160). For example, when the reference score is 10 points, the processor 241 may be configured to determine to engage the disconnector when the calculated first operation score is 15 points. On the other hand, in response to determining that the calculated first operation score is less than the first reference score, the processor 241 may be configured to determine to disengage the disconnector (non-engagement of disconnector) (S170). For example, the processor 241 may be configured to determine to disengage the disconnector when the calculated first operation score is 5 points and is less than the first reference score of 10 points.

The processor 241 may be configured to operate the disconnector 170 according to the determination of the engagement and disengagement of the disconnector (S180). The processor 241 may be configured to engage or disengage the disconnector 170 according to the determination in S160 or S170. When the driving condition does not correspond to the downhill driving in S120, the processor 241 may be configured to determine whether the driving condition is a turning driving (S210). When the driving condition corresponds to a turning driving, the processor 241 may be configured to acquire a second related factor (S220). The second related factor may include a steering angle, a steering angular velocity, and a yaw rate error of the vehicle 100. The processor 241 may be configured to estimate the steering angle and the steering angular speed for turning based on a road curvature (turning radius) acquired using the navigation device 210 and/or the sensing device 220. In addition, the processor 241 may be configured to determine the yaw rate error of the vehicle 100 using a steering angle sensor, a yaw rate sensor, or the like.

The processor 241 may be configured to calculate a second operation score based on the second related factor (S230). The processor 241 may be configured to determine a score for each factor by referring to a score calculation reference table stored in the memory 242 in advance, and calculate (compute) the second operation score by summing up scores for determined factors. The processor 241 may be configured to determine whether the calculated operation score is greater than or equal to a second reference score (S240). The second reference score may be equal to or different from the first reference score.

In response to determining that the calculated second operation score is greater than or equal to the second reference score, the processor 241 may be configured to determine the engagement of the disconnector (S250). In response to determining that the calculated second operation score is less than the second reference score, the processor 241 may be configured to determine the disengagement of the disconnector (S260). The processor 241 may be configured to operate the disconnector 170 according to the determination of the engagement and disengagement of the disconnector (S270). When the engagement of the disconnector is determined, the processor 241 may engage the disconnector 170 to allow the vehicle to drive in four-wheel drive manner, and when the disengagement of the disconnector is determined, the processor 241 may disengage the disconnector 170 to allow the vehicle to drive in two-wheel drive manner.

When the driving condition does not correspond to the turning driving in S210, the processor 241 may be configured to determine whether the driving condition corresponds to the constant-speed driving (S310). In particular, the processor 241 may be configured to determine whether the constant-speed driving is a low-speed constant-speed driving, a medium-speed constant-speed driving, or a high-speed constant-speed driving. The processor 241 may be configured to determine which of a low-speed section, a medium-speed section, and a high-speed section, a constant-speed driving speed of the vehicle 100, that is, a constant-speed driving vehicle speed belongs to, and accordingly determine the low-speed constant-speed driving, the medium-speed constant-speed driving, or the high-speed constant-speed driving. In particular, the low-speed section may be a vehicle speed section that is less than the first reference vehicle speed, the high-speed section may be a vehicle speed section that is greater than the second reference vehicle speed, and the medium-speed section may be a vehicle speed section that is greater than the first reference vehicle speed and is less than the second reference vehicle speed.

When the driving condition corresponds to the constant-speed driving, the processor 241 may be configured to determine whether the constant-speed driving speed of the vehicle 100, that is, the constant-speed driving vehicle speed is similar to the first reference vehicle speed (S320). The processor 241 may be configured to determine whether a difference between the constant-speed driving vehicle speed and the first reference vehicle speed is within a critical range.

When the constant-speed driving vehicle speed is not similar to the first reference vehicle speed, the processor 241 may be configured to determine whether the constant-speed driving vehicle speed is similar to the second reference vehicle speed (S330). The processor 241 may be configured to determine whether a difference between the constant-speed driving vehicle speed and the second reference vehicle speed is within the critical range. The processor 241 may be configured to acquire a third related factor when the constant-speed driving vehicle speed is similar to the first reference vehicle speed in S320 or the constant-speed driving vehicle speed is similar to the second reference vehicle speed in S330 (S340). For the third related factor, an initial value (or current set value) of the first reference vehicle speed and/or the second reference vehicle speed, a constant-speed holding time, and a constant-speed holding speed may be acquired as related factors.

The processor 241 may be configured to adjust the timing of the engagement and disengagement of the disconnector using the third related factor (S350). The processor 241 may be configured to change the first reference vehicle speed or the second reference vehicle speed using the third related factor. When the constant-speed driving vehicle speed is similar to the first reference vehicle speed, the processor 241 may be configured to perform adjustment to decrease the first reference vehicle speed based on the third related factor. When the constant-speed driving vehicle speed is similar to the second reference vehicle speed, the processor 241 may be configured to perform adjustment to increase the second reference vehicle speed based on the third related factor.

The processor 241 may be configured to operate the disconnector 170 based on the adjusted timing of the engagement and disengagement of the disconnector (S360). The processor 241 may engage or disengage the disconnector 170 based on the changed first reference vehicle speed and second reference vehicle speed. The processor 241 may engage the disconnector 170 when the constant-speed driving vehicle speed is less than or equal to the changed first reference vehicle speed or is greater than the changed second reference vehicle speed. The processor 241 may disengage the disconnector 170 when the constant-speed driving vehicle speed is greater than the changed first reference vehicle speed or is less than or equal to the changed second reference vehicle speed.

As described above, when the constant-speed driving vehicle speed is similar to the first reference vehicle speed or the second reference vehicle speed under the low-speed constant-speed driving condition, it may be possible to perform adjustment to decrease the first reference vehicle speed or increase the second reference vehicle speed, thus allowing the vehicle to drive in the two-wheel drive without switching between engagement and disengagement of the disconnector 170 to improve fuel efficiency.

The processor 241 may be configured to determine whether the constant-speed driving vehicle speed is greater than the first reference vehicle speed and is less than or equal to the second reference vehicle speed in S330 when the constant-speed driving vehicle speed is not similar to the second reference vehicle speed in S330 (S410). The processor 241 may be configured to determine whether the constant-speed driving vehicle speed belongs to the medium-speed section when the constant-speed driving vehicle speed is not similar to the first reference vehicle speed and the second reference vehicle speed. In other words, the processor 241 may be configured to determine whether the driving condition of the vehicle 100 corresponds to the medium-speed constant-speed driving.

Additionally, the processor 241 may be configured to determine whether the constant-speed driving torque is similar to the reference torque when the constant-speed driving vehicle speed is greater than the first reference vehicle speed and is less than or equal to the second reference vehicle speed (S420). The processor 241 may be configured to determine whether a difference between the constant-speed driving torque and the reference torque is within a critical range (critical torque range) when the vehicle 100 is in the medium-speed constant-speed driving.

When the constant-speed driving torque is similar to the reference torque, the processor 241 may be configured to acquire a fourth related factor (S430). When the difference between the constant-speed driving torque and the reference torque is within a critical range, the processor 241 may be configured to acquire the initial value of the reference torque, the frequency of change in the required torque, and the high required torque holding time in the medium-speed section as a related factor. The processor 241 may then be configured to adjust the timing of the engagement and disengagement of the disconnector using the fourth related factor (S440). The processor 241 may be configured to perform adjustment to decrease the reference torque using the fourth related factor.

The processor 241 may be configured to operate the disconnector 170 based on the adjusted timing of the engagement and disengagement of the disconnector (S450). The processor 241 may then be configured to compare the constant-speed driving torque with the changed reference torque and engage or disengage the disconnector 170 according to a result of the comparison. The disconnector 170 may be operated based on the reference torque adjusted to be decreased, thus allowing the vehicle to drive in the two-wheel drive without switching between engagement and disengagement of the disconnector 170 to improve fuel efficiency.

The processor 241 may be configured to operate the disconnector 170 based on the timing of engagement and disengagement of an existing disconnector when the constant-speed driving vehicle speed is less than or equal to the first reference speed or is greater than the second reference speed in S410, or when the constant-speed driving torque is not similar to the reference torque in S420 (S460). The processor 241 may be configured to control the engagement and disengagement of the disconnector 170 based on the first reference vehicle speed, the second reference vehicle speed, and the reference torque, which are set in advance.

Figure 5:
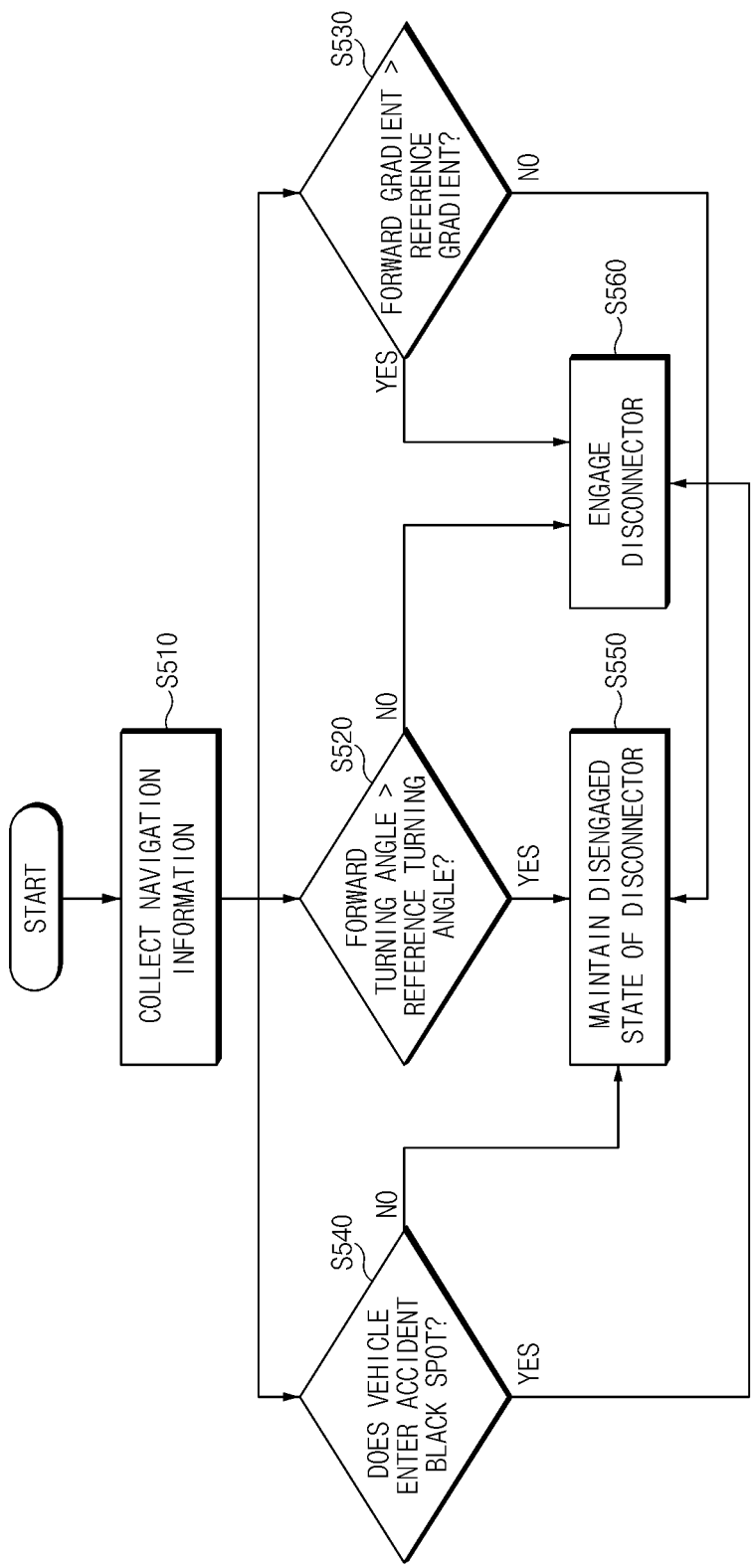
FIG. 5 is a flowchart showing a method for controlling a disconnector of an electric vehicle according to another exemplary embodiment of the present disclosure.

FIG. 5 is a flowchart showing a method for controlling a disconnector of an electric vehicle according to another exemplary embodiment of the present disclosure. This exemplary embodiment describes a method of operating the disconnector 170 using navigation information. Referring to FIG. 5, the processor 241 may be configured to collect navigation information from the navigation device 210 in a state in which the disconnector 170 is disengaged (S510). In particular, the processor 241 may be configured to receive information regarding a forward road of the vehicle 100 from the navigation device 210. The forward road information may include a turning angle of the forward road, a gradient of the forward road, the presence or absence of an accident black spot and the like.

The processor 241 may be configured to determine whether a forward turning angle of the navigation information is greater than a reference turning angle (S520). In addition, the processor 241 may be configured to determine whether the forward gradient in the navigation information is greater than the reference gradient (S530). In addition, the processor 241 may be configured to determine whether the vehicle 100 enters an accident black spot based on the navigation information (S540).

The processor 241 may maintain a disengaged state of the disconnector 170 when the forward turning angle is greater than a reference tuning angle, when the forward gradient is equal to or less than the reference gradient, and/or when the vehicle does not enter the accident black spot (S550). On the other hand, the processor 241 may engage the disconnector 170 when the forward turning angle is less than or equal to the reference turning angle, when a forward gradient is greater than a reference gradient, and/or when the vehicle enters an accident black spot (S560).

Figure 6:
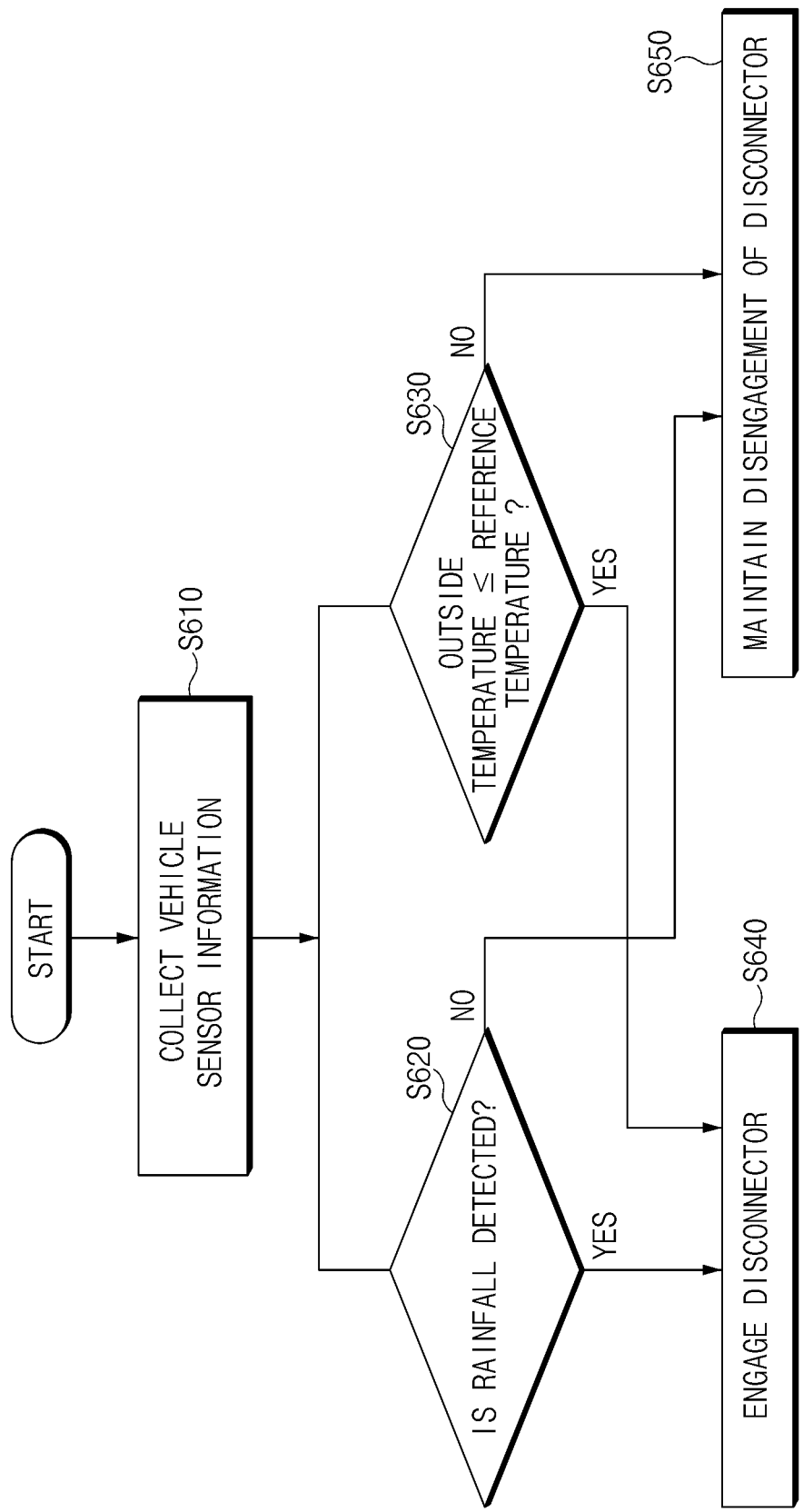
FIG. 6 is a flowchart showing a method for controlling a disconnector of an electric vehicle according to another exemplary embodiment of the present disclosure.

FIG. 6 is a flowchart showing a method for operating a disconnector of an electric vehicle according to another exemplary embodiment of the present disclosure. This exemplary embodiment describes a method of operating the disconnector 170 using sensors mounted on the vehicle 100. The processor 241 may be configured to collect sensor information using the sensors mounted on the vehicle 100 in a state in which the disconnector 170 is disengaged (S610). The processor 241 may be configured to acquire the amount of rainfall and an outside temperature (outdoor temperature) using a rain sensor and/or a temperature sensor.

The processor 241 may be configured to determine whether rainfall is detected using the rain sensor (S620). Further, the processor 241 may be configured to determine whether the outside temperature measured by the temperature sensor is less than or equal to a reference temperature (e.g., about 0° C.) (S630). The processor 241 may engage the disconnector 170 when rainfall is detected by the rain sensor and/or when the outside temperature is less than or equal to the reference temperature (S640). On the other hand, the processor 241 may maintain the disengaged state of the disconnector 170 when rainfall is not detected and/or when the outside temperature is greater than the reference temperature (S650).

In this exemplary embodiment, it is described, as an example, that the engagement and disengagement of the disconnector 170 is determined according to whether the rainfall is detected by the rain sensor, but the present disclosure is not limited thereto, and the engagement and disengagement of the disconnector 170 may be determined based on the amount of rainfall detected by the rain sensor. For example, the processor 241 may be configured to determine the engagement of the disconnector 170 when the amount of rainfall measured by the rain sensor is greater than a reference amount of rainfall and determines the disengagement of the disconnector 170 when the measured amount of rainfall is less than or equal to the reference amount of rainfall.

Figure 7:
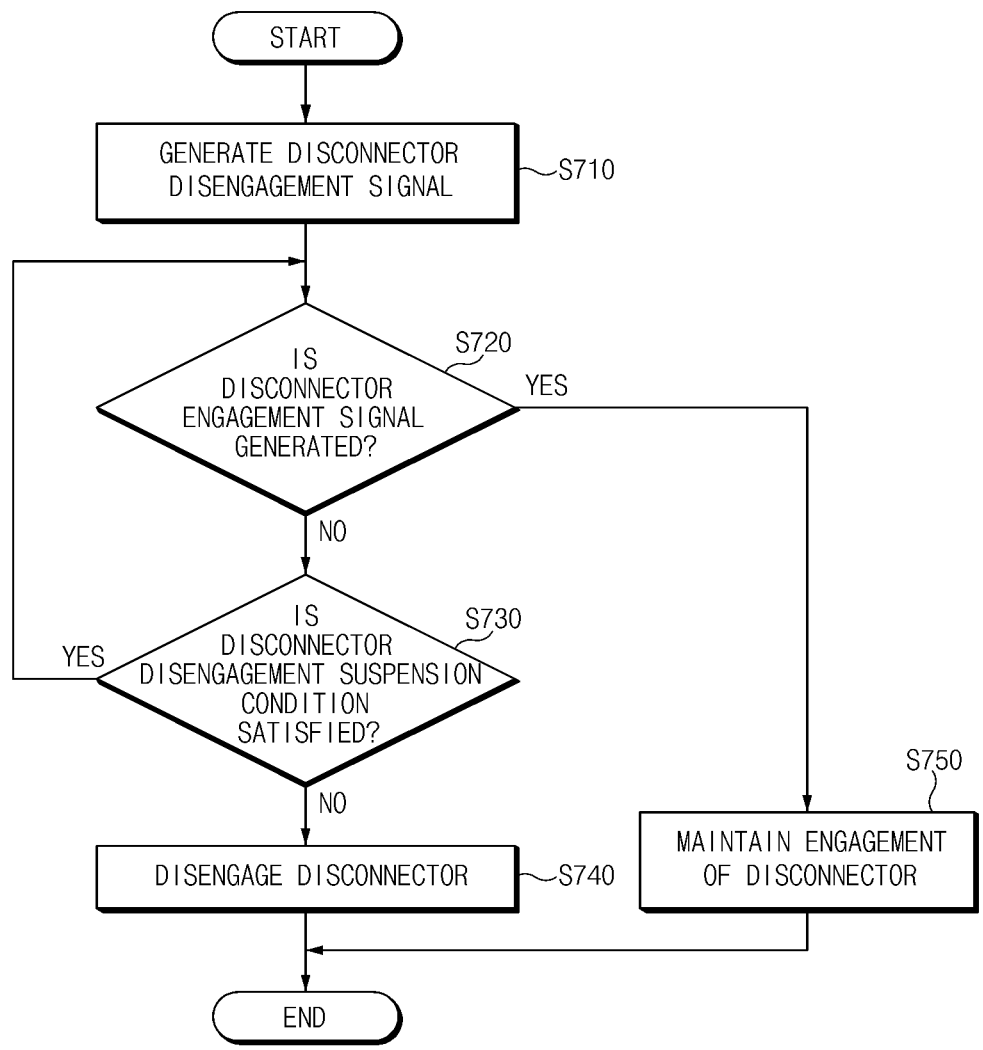
FIG. 7 is a flowchart illustrating a method of controlling suspension of disengagement of a disconnector of an electric vehicle according to an exemplary of the present disclosure.

FIG. 7 is a flowchart illustrating a method of controlling suspension of disengagement of a disconnector of an electric vehicle according to an exemplary embodiment of the present disclosure. The processor 241 may be configured to detect the generation of a disconnector disengagement signal while the vehicle 100 is being driven in a state in which the disconnector 170 is engaged (S710). The processor 241 may be configured to detect the disconnector disengagement signal when the disconnector disengagement signal is output from an algorithm (program) for determining the engagement or disengagement of the disconnector according to the disconnector control method described above.

The processor 241 may be configured to determine whether a disconnector engagement signal is generated while the disconnector disengagement signal is generated (S720). The processor 241 may be configured to determine whether the disconnector engagement signal is output form the algorithm for determining the engagement or disengagement of the disconnector. The processor 241 may be configured to determine whether a disconnector disengagement suspension condition is satisfied when the disconnector engagement signal is not generated (S730). The processor 241 may be configured to determine whether a predetermined time has elapsed and/or whether the vehicle 100 has moved beyond a predetermined distance after the disconnector disengagement signal is generated.

In response to determining that the vehicle 100 satisfies disconnector disengagement suspension condition, the processor 241 may return to S720 to re-determine whether the disconnector engagement signal is generated. The processor 241 may be configured to perform a subsequent process according to a result of the redetermination. In other words, the processor 241 may suspend the disengagement of the disconnector 170 until a predetermined time has elapsed and/or the vehicle has moved beyond the predetermined distance after the disconnector engagement signal is generated.

The processor 241 may disengage the disconnector 170 when the disconnector disengagement suspension condition is not satisfied (S740). The processor 241 may be configured to switch an operation mode of the disconnector 170 from an engaged state to a disengaged state when the predetermined time has elapsed and/or the vehicle has moved beyond the predetermined distance after the disconnector disengagement signal is generated. The processor 241 may maintain the engaged state of the disconnector 170 when the disconnector engagement signal is generated in S720 (S750). When a signal (engagement signal) indicating the engagement of the disconnector 170 is generated, the processor 241 may maintain the engagement of the disconnector 170 until the next disengagement signal is generated.

Figure 8:
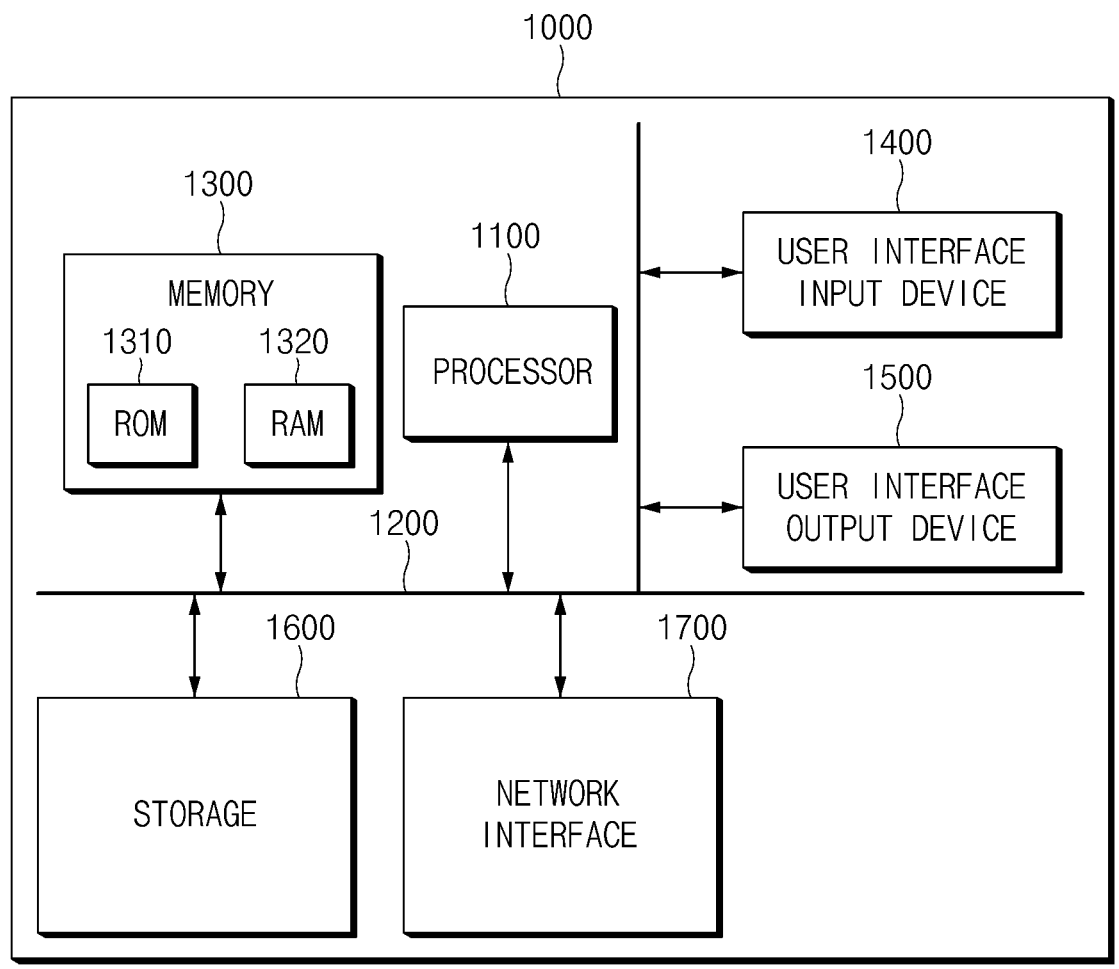
FIG. 8 is a block diagram of a computing system for executing a method for controlling a disconnector of an electric vehicle according to an exemplary embodiment of the present disclosure.

FIG. 8 is a block diagram of a computing system for executing a method for controlling a disconnector of an electric vehicle according to an exemplary embodiment of the present disclosure. Referring to FIG. 8, a computing system 1000 may include at least one processor 1100, a memory 1300, a user interface input device 1400, a user interface output device 1500, storage 1600, and a network interface 1700, which are connected with each other via a bus 1200. The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains. Accordingly, the embodiment disclosed in the present invention is not intended to limit the technical idea of the present invention but to describe the present invention, and the scope of the technical idea of the present invention is not limited by the exemplary embodiment. The scope of protection of the present disclosure should be interpreted by the following claims, and all technical ideas within the scope equivalent thereto should be construed as being included in the scope of the present disclosure.

According to the present disclosure, it may be possible to control engagement and disengagement of a disconnector based on the driving conditions of a vehicle and factors affecting the operation of the disconnector, thus improving fuel efficiency and operability (vehicle safety) with real roads.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A disconnector control device for an electric vehicle, comprising:
a disconnector configured to switch wheel driving manners; and
a processor configured to:
detect a driving condition of the vehicle including a downhill driving condition and a turning driving condition,
when the driving condition is detected to be the downhill driving condition:
acquire, using at least one of a navigation device and a sensing device, a plurality of first factors related to operation of the disconnector, the plurality of first factors including a road surface slope, regenerative braking torque, and a difference in wheel speed between a front wheel and a rear wheel,
determine a first score for each of the plurality of first factors individually by referring to a first score calculation reference table in a memory;
calculate a first operation score by summing up each of the first scores for the plurality of first factors;
compare the first operation score to a first reference score; and
operate the disconnector based on the acquired plurality of first factors by engaging the disconnector in response to determining that the calculated first operation score is greater than or equal to the first reference score; and
when the driving condition is detected to be the turning driving condition,
acquire, using at least one of the navigation device and the sensing device, a plurality of second factors,
determine a second score for each of the plurality of second factors individually by referring to a second score calculation reference table in the memory,
calculate a second operation score by summing up each of the second scores for the plurality of second factors, and
compare the first operation score to a second reference score.

2. The disconnector control device of claim 1, wherein the plurality of second factors include a steering angle, a steering angular velocity, and a yaw rate error of the vehicle, and
when the driving condition is detected to be the turning driving condition, the processor is further configured to
operate the disconnector based on the acquired plurality of second factors by engaging the disconnector in response to determining that the calculated second operation score is greater than or equal to the second reference score.

3. The disconnector control device of claim 1, wherein the driving condition of the vehicle further includes a constant-speed driving condition; and
when the driving condition is detected to be the constant speed driving condition, the processor is further configured to:
determine whether a speed difference between a constant-speed driving vehicle speed and a first reference vehicle speed or a speed difference between the constant-speed driving vehicle speed and a second reference vehicle speed is within a critical vehicle speed range.

4. The disconnector control device of claim 3, wherein the processor is configured to perform adjustment to decrease the first reference vehicle speed based on an initial value of the first reference vehicle speed, a constant-speed holding time, and a constant-speed holding speed in response to determining that the speed difference between the constant-speed driving vehicle speed and the first reference vehicle speed is within the critical vehicle speed range.

5. The disconnector control device of claim 3, wherein the processor is configured to perform adjustment to increase the second reference vehicle speed based on an initial value of the second reference vehicle speed, a constant-speed holding time, and a constant-speed holding speed in response to determining that the speed difference between the constant-speed driving vehicle speed and the second reference vehicle speed is within the critical vehicle speed range.

6. The disconnector control device of claim 3, wherein the processor is configured to:
acquire an initial value of a reference torque, frequency of change in a required torque, and a high required torque holding time in a medium-speed section in response to determining that the constant-speed driving vehicle speed is greater than the first reference vehicle speed and is less than or equal to the second reference vehicle speed and a difference between a constant-speed driving torque and the reference torque is within a critical torque range, and
perform adjustment to decrease the reference torque based on the initial value of the reference torque, the frequency of change in the required torque, and the high required torque holding time in the medium-speed section.

7. A disconnector control method for an electric vehicle, comprising:
detecting, by a processor, a driving condition of the vehicle including a downhill driving condition and a turning driving condition;
when the driving condition is detected to be the downhill driving condition,
acquiring, by the processor using at least one of a navigation device and a sensing device, a plurality of first factors related to operation of a disconnector, the plurality of first factors including a road surface slope, regenerative braking torque, and a difference in wheel speed between a front wheel and a rear wheel;
determining, by the processor, an operation mode of the disconnector based on the plurality of first factors; and
operating, by the processor, the disconnector according to the determined operating mode,
wherein the determining of the operation mode of the disconnector based on the plurality of first factors includes:
determining, by the processor, a first score for each of the plurality of first factors individually by referring to a first score calculation reference table in a memory;
calculating, by the processor, a first operation score by summing up each of the first scores for the plurality of first factors;
comparing, by the processor, the calculated first operation score with a first reference score; and
determining, by the processor, engagement of the disconnector when the calculated first operation score is greater than or equal to the first reference score;
when the driving condition is detected to be the turning driving condition,
acquiring, by the processor using at least one of the navigation device and the sensing device, a plurality of second factors,
determining, by the processor, a second score for each of the plurality of second factors individually by referring to a second score calculation reference table in the memory;

calculating, by the processor, a second operation score by summing up each of the second scores for the plurality of second factors, and comparing, by the processor, the second operation score to a second reference score.

8. The disconnector control method of claim 7, wherein the plurality of second factors include a steering angle, a steering angular velocity, and a yaw rate error of the vehicle.

9. The disconnector control method of claim 8, further comprising, when the driving condition is detected to be the turning driving condition, operating, by the processor, the disconnector based on the acquired plurality of second factors by engaging the disconnector in response to determining that the calculated second operation score is greater than or equal to the second reference score.

10. The disconnector control method of claim 7, wherein the driving condition further includes a constant-speed driving condition and, when the driving condition is detected to be the constant-speed driving condition, the method further comprises:

determining, by the processor, whether a speed difference between a constant-speed driving vehicle speed and a first reference vehicle speed is within a critical vehicle speed range under the constant-speed driving condition;

determining, by the processor, whether a speed difference between the constant-speed driving vehicle speed and a second reference vehicle speed is within a critical vehicle speed range; and acquiring, by the processor, an initial value of the first reference vehicle speed or the second reference vehicle speed, a constant-speed holding time, a constant-speed holding speed when the speed difference between the constant-speed driving vehicle speed and the first reference vehicle speed or the speed difference between the constant-speed driving vehicle speed and the second reference vehicle speed is within the critical vehicle speed range.

11. The disconnector control method of claim 10, further comprising:

performing, by the processor, adjustment to decrease the first reference vehicle speed based on the initial value of the first reference vehicle speed, the constant-speed holding time, and the constant-speed holding speed; and determining, by the processor, engagement or disengagement of the disconnector based on the adjusted first reference vehicle speed.

12. The disconnector control method of claim 10, further comprising:

performing, by the processor, adjustment to increase the second reference vehicle speed based on the initial value of the second reference vehicle speed, the constant-speed holding time, and the constant-speed holding speed; and determining, by the processor, engagement or disengagement of the disconnector based on the adjusted second reference vehicle speed.

13. The disconnector control method of claim 10, further comprising:

determining, by the processor, whether a difference between a constant-speed driving torque and a reference torque is within a critical torque range in response to determining that the constant-speed driving vehicle speed is greater than the first reference vehicle speed and is less than or equal to the second reference vehicle speed under the constant-speed driving condition; and acquiring, by the processor, an initial value of the reference torque, frequency of change in a required torque, a high required torque holding time in a medium-speed section in response to determining that the difference between the constant-speed driving torque and the reference torque is within the critical torque range.

14. The disconnector control method of claim 13, further comprising performing, by the processor, adjustment to decrease the reference torque based on the initial value of the reference torque, the frequency of change in the required torque, and the high required torque holding time in the medium-speed section.

* * * * *